Figure 1:
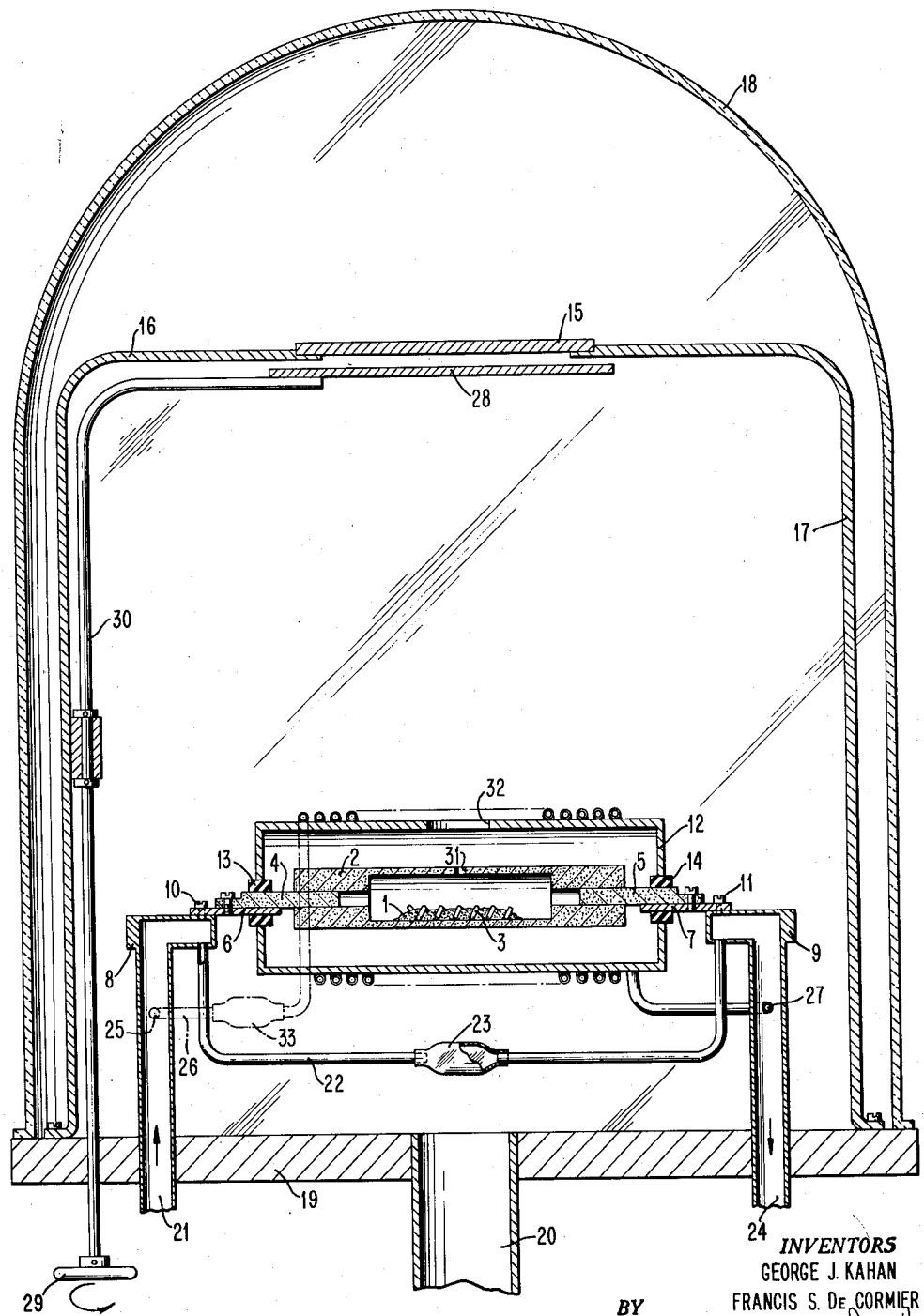

United States Patent Office 3,058,842
Patented Oct. 16, 1962

3,058,842
EVAPORATION METHOD
George J. Kahan, Port Washington, and Francis S. de Cormier, Poughkeepsie, N.Y., assignors to International Business Machines Corporation, New York, N.Y., a corporation of New York
Filed Dec. 29, 1958, Ser. No. 783,437
13 Claims. (Cl. 117—107)

This invention relates to a method of evaporating materials, and more particularly to a method of obtaining rapid thermal evaporation of metals in a vacuum.

Vacuum evaporation has long been employed as a means for applying surface coatings to a large variety of articles including lenses, magnetic tapes, printed circuits, and the like. Generally, the methods of the prior art consist, essentially, of heating a coating metal in a vacuum and directing the vapors therefrom onto the article or substrate to be coated. Additionally, a filter or baffle may be interposed in the vapor stream in order to prevent large particles or flakes from arriving at the substrate. Recently, because of advances of the state of the art in many fields including, by way of example, transistor fabrication and cryogenics, there has arisen the need of obtaining extremely thin coatings having a degree of purity and uniformity greater than previously possible.

In order to obtain a pure coating it is desirable to evaporate the metal at a rapid rate in a high vacuum. The high vacuum reduces the number of residual gas molecules present in the system, and the rapid evaporation rate minimizes the time during which these molecules can contact the substrate. The fewer gas molecules that adhere to the substrate during the evaporation period, the purer the resulting coating. Additionally, a more rapid rate of evaporation of the coating metal results in smaller granules being vaporized and therefore a more uniform coating formed on the substrate surface. Finally, a constant rate of evaporation results in reproducible coatings which have a constant grain size being obtained.

However, it has been found that attempts to increase the evaporation rate have resulted in less uniform coatings than those that have been obtained at lower evaporation rates. The results from the fact that during the evaporation, most metals exhibit an oxide skin on the surface of the molten metal. This oxide results either from residual oxide in the metal itself or is formed by the coating metal in combination with residual gas molecules of oxygen, water, or carbon monoxide remaining in the vacuum chamber. This coating metal oxide which has a lower vapor pressure than the metal itself forms a thin skin on the surface preventing evaporation of the metal thereunder. The increased heat, necessary in order to obtain an increased evaporation rate, causes sporadic bursting of portions of the skin due to the increased vapor pressure which builds up beneath the skin. This bursting results in groups of atoms being deposited on the substrate, rather than obtaining the desired coating through normal condensation.

This problem has long been recognized and prior art methods have attempted various solutions, one of which is described in Vacuum Evaporation of Thin Films, L. Holland, page 105, John Wiley and Sons, Inc., 1956, and includes adding an outgassing chamber to the normal evaporation chamber and syphoning molten metal from the outgassing chamber into the evaporation chamber from a level below the surface on which the oxide skin is formed. This method allows some increase in the evaporation rate in the second chamber, but is not completely successful due to the residual oxygen molecules remaining in the second chamber.

What has been discovered is an economical and efficient method of evaporating a metal wherein no oxide layer is present during the evaporation time. By this method, a more rapid rate of evaporation is possible. The method consists, essentially, of adding a reducing metal to the coating metal. This reducing metal is characterized in that at a predetermined temperature and pressure, it has a lower vapor pressure than the coating metal and is capable of forming an oxide which has a higher vapor pressure than the coating metal. In the method, the substrate is first shielded and a first temperature is obtained at which the oxide of the coating metal present is volatilized in the form of an oxide of the reducing metal. When essentially all of the oxide is volatilized, the desired evaporation temperature is obtained. At this temperature, the shield is removed from the substrate, and the desired rapid evaporation then proceeds.

An object of the invention is to provide a method of obtaining a more rapid thermal evaporation of metals in a vacuum.

Another object of the invention is to provide a method of obtaining thin coatings of a metal having a high degree of purity and uniformity.

Yet another object of the invention is to provide a method of obtaining reproducible thin coatings.

A related object of the invention is to provide a method of removing oxygen from a metal.

Other objects of the invention will be pointed out in the following description and claims, and illustrated in the accompanying drawing, which discloses, by way of example, the principle of the invention and the best mode which has been contemplated of applying that principle.

In the drawing:

FIG. 1 is a cross-sectional view illustrating an apparatus which may be employed in practicing the method of the invention.

As an aid in understanding the process of the invention a specific illustration of the manner by which the novel features of the invention provide a method of obtaining the required coatings will be described, by way of example, with respect to cryogenic devices, it being understood, however, that the method and techniques of the invention may also be employed whenever it is necessary to obtain coatings of the purity and uniformity made possible by this process.

Generally, cryogenic devices include a plurality of superconductive gate conductors and a plurality of superconductive control conductors. Current in selected control conductors generates magnetic fields, and these fields, which are applied to gate conductors associated with the selected control conductors, cause the gate conductors to switch from the superconducting state to the resistive state. Further, information on cryogenic devices is contained in an article by D. A. Buck, in the Proceedings of the Institute of Radio Engineers, vol. 44, page 482, April 1956.

A recent advance in the cryogenic art has been the development of thin film cryogenic devices of the type described in copending application, Serial No. 625,512, filed November 30, 1956, on behalf of Richard L. Garwin and assigned to the assignee of this invention. These thin film devices are conveniently fabricated by means of thermal evaporation in a vacuum, of alternate layers of metals and insulators. It has been found, however, that impurities in the deposited metals greatly influence their characteristics and it has been difficult until now to control the impurity content in order to obtain reproducible cryogenic devices. Since these deposited metals have thicknesses of the order of 1000 Angstrom units $(1+10^{-5}$ cm.), it will be understood that minute variations in the impurity content can result in disproportionally large variation in the characteristics. In particular, the characteristics which are influenced by impurities include the critical field, which is the field required to switch a superconductive conductor from the superconducting state to the resistive state; the critical temperature, which is the temperature at which superconduction appears in the absence of an applied magnetic field; the critical self-current which is the maximum current a superconducting element can conduct before the field generated by this current itself destroys superconductivity; the slope of the transition curve between the superconducting state and resistive state; and the thermal and magnetic time constants. In order to employ thin film cryogenic devices in large scale devices, such as computers or the like, it is desirable that each of the above characteristics be accurately controlled within close limits. As an example, each of the gate conductors must have about the same value of critical temperature and critical self-current to ensure that all will be superconducting at the operating temperature in the absence of an applied magnetic field. Additionally, each of the gate conductors must have about the same critical field value, to ensure the selected gate conductors are in the resistive state when subjected to the magnetic field of an associated control conductor.

The novel method, for use in the fabrication of thin film cryogenic devices, includes the following steps. The coating metal is placed in a suitable evaporation source structure or furnace. A reducing metal, which may be in the form of a wire, strip, coil, or in any other convenient shape is also mounted in the source structure. The vacuum chamber is then sealed, and after the normal outgassing procedure has been followed, the chamber is evacuated and a shutter is positioned adjacent the substrate to prevent evaporated particles from the source arriving at the substrate. Thermal energy is next applied to the furnace by means of an electric current, radiation, or other similar means to heat the coating and reducing metals to a first predetermined temperature. At this temperature, the reducing metal has a vapor pressure so low that essentially little of it is volatilized. However, the reducing metal rapidly forms an oxide with any residual coating metal oxide present, and the oxide thus formed has a vapor pressure sufficiently high, at the first predetermined temperature, to be rapidly evaporated and deposited on the shutter. After all of the coating metal oxide has been evaporated as an oxide of the reducing metal, a second predetermined temperature is obtained at which rapid evaporation of the coating metal occurs. After this temperature has stabilized, the shutter is removed from the substrate, and the coating metal is rapidly deposited thereon.

As a specific example, tin is a desirable metal for use as gate conductors in thin film cryogenic devices, having a critical temperature of about 3.7° Kelvin. However, since metallic tin is usually refined from an ore consisting, essentially, of stannic oxide (cassiterite), there invariably remains some oxide in the metallic tin, even though the refined metal may be 99.999% pure. This residual oxide which may also result from tin in contact with air has prevented rapid uniform evaporation rates as herein before described.

In order to obtain a more rapid evaporation of tin than previously possible, the apparatus shown in FIG. 1 may be employed. The metallic tin 1 is placed in crucible 2, which, for reasons discussed below, is preferably fabricated of graphite. A coil of reducing metal 3 is also added to crucible 2. This reducing metal is preferably molybdenum, tantalum, or tungsten since each of these metals has a vapor pressure which is relatively low compared to the vapor pressure of tin; and additionally, each of these metals is capable of forming an oxide which is volatile at a temperature lower than the desired evaporation temperature of tin. End plugs 4 and 5 are next slidably engaged with crucible 2 and fastened to copper straps 6 and 7. By means of these slidable plugs, thermal stresses are prevented in crucible 2. Next, copper straps 6 and 7 are secured to the hollow electrodes 8 and 9 by means of bolts 10 and 11. These straps are insulated from copper shield 12 by the non-conducting grommets 13 and 14. Substrate 15 is positioned above the evaporation source structure by rods 16 and 17.

The next step in the process is to mount bell housing 18 on base plate 19 and reduce the pressure therein to between $10^{-5}$ and $10^{-7}$ mm. Hg through the use of a vacuum pump, not shown, attached to opening 20. Circulating water is then forced through opening 21, electrode 8, line 22, glass insulator 23, electrode 9 and opening 24. Additionally, a portion of the water entering opening 21 is fed through opening 25, line 26, which is coiled around shield 12, insulator 33 and opening 27, to opening 24. This water cooling prevents the radiation of energy from the evaporation source structure to other portions of the system. Before electrical energy is supplied to electrodes 8 and 9, shutter 28 is positioned adjacent to substrate 15, by means of knob 29 and shaft 30, in order to intercept all particles, molecules or atoms from the source.

A power supply capable of delivering, by way of example, 400 amperes at 10 volts is next connected to electrodes 8 and 9 in order to raise the temperature of the metals to about 1200° centigrade. As the temperature of the metals is increased the tin becomes molten at about 250° centigrade, and immediately the oxide skin may be observed on the surface. As the temperature further increases and nears 1200° centigrade, a highly volatile oxide of either molybdenum, tantalum, or tungsten, depending on the reducing metal employed, is rapidly formed. After a short time interval, which at 1200° centigrade is about 30 seconds, but which may vary somewhat depending on the degree of purity of the metallic tin, the surface of the molten metal is observed to be free of the usual oxide skin.

The temperature of the metals is next increased to about 1600° centigrade, and after this temperature is stabilized, shutter 28 is rotated away from substrate 15. Volatilized tin is then deposited thereon at a uniform rate through opening 31 in crucible 2 and opening 32 in shield 12. After obtaining the desired thickness of tin coating on substrate 15, shutter 28 is again rotated to shield the substrate, and the system is returned to room temperature.

Although thermal evaporation of metals in a vacuum is primarily a surface phenomenon, when evaporation temperatures much greater than 1600° centigrade are employed to obtain even greater evaporation rates of tin, it is necessary to ensure that the tin is heated evenly throughout its entire volume in order to prevent the formation of vapor bubbles within the tin. These bubbles, upon reaching the surface of the molten tin, burst and may deposit particles of non-uniform size upon the substrate.

Graphite is the preferred material for the evaporation source structure since, generally, it does not alloy with the metal to be evaporated. Other materials normally used in evaporator sources and furnaces such as tantalum and molybdenum are capable of forming volatile oxides as hereinbefore described as well as alloying with the coating metal at high temperatures. This effect has been noticed by the selective pitting and eroding of these metals when used as evaporation furnaces.

While the process of the invention has been illustrated with tin as a specific example, it will be understood that the process may also be employed in obtaining thin coatings of many other metals, particularly those metals wherein an oxide skin has heretofore limited the rate of evaporation.

While there have been shown and described and pointed out the fundamental novel features of the invention as applied to a preferred embodiment, it will be understood

What is claimed is:

1. The method of rapidly evaporating coatings of a first metal in a vacuum and onto a substrate so as to have a high degree of purity and uniformity comprising the steps of placing said first metal and a second metal within an evaporation source structure, said second metal being selected from the group consisting of molybdenum, tantalum, and tungsten, said source structure consisting of a material ineffective to alloy with either of said first and said second metals; subjecting said source structure to a first predetermined temperature at which said first metal only is changed to a liquid state and flows in contact with said second metal, said second metal being capable of reducing oxide impurities of said first metal and forming an oxide volatilizable at said first temperature whereby clean surfaces of said liquid first metal are exposed; subsequently subjecting said source structure to a second predetermined temperature below the melting temperature of said second metal and at which said first metal is rapidly evaporated; and exposing said substrate during said last-mentioned step to allow said evaporated first metal to be deposited thereon.

2. The method of claim 1 wherein said first metal is tin.

3. The method of claim 1 wherein said second metal is molybdenum.

4. The method of claim 1 wherein said second metal is tantalum.

5. The method of claim 1 wherein said second metal is tungsten.

6. The method of vacuum-depositing metallic coatings having a high degree of purity and uniformity on the surface of a substrate comprising in combination the steps of mounting said substrate in spaced relationship to a graphite evaporation source structure within a vacuum chamber of predetermined pressure; placing a coating metal and a reducing metal within said source, said reducing metal being selected from the group consisting of molybdenum, tantalum, and tungsten; elevating said source to a first predetermined temperature above the melting temperature of said coating metal and below that of the reducing metal to cause said reducing metal to purify said coating metal by forming volatile compounds with oxide impurities floating on the surface of the latter, said compounds being volatilized at said first temperature to expose clean surfaces of said coating metal; shielding said substrate from said source while said compounds are being volatilized; subsequently elevating said source to a second predetermined temperature above the evaporation temperature of said coating metal and below the melting temperature of said reducing metal whereby said coating metal only is volatilized at a rapid rate so as to be uniformly deposited on said substrate; and exposing said substrate to said source while said coating metal only is being volatilized.

7. The method of rapidly depositing first metal coatings having a high degree of purity and uniformity onto a substrate in a vacuum chamber of predetermined pressure comprising the steps of placing said first metal and a second metal within an evaporation furnace, said evaporation furnace formed of material ineffective to alloy with said first metal; subjecting said first and second metals to a first predetermined temperature at which said first metal only liquefies and said second metal is capable of forming an oxide having a vapor pressure greater than that of said first metal, said second metal being selected from the group consisting of molybdenum, tantalum, and tungsten; maintaining said first predetermined temperature for a time sufficient to volatilize any oxide of said first metal floating on the surface of said liquid first metal as an oxide of said second metal whereby clean surfaces of said liquid first metal are exposed; subsequently subjecting said first and said second metals to a second predetermined temperature above the evaporation temperature of said first metal and below the melting temperature of said second metal to evaporate only said first metal, and exposing said substrate concurrently with said last-mentioned step to allow said evaporated first metal to be deposited thereon.

8. The method of depositing tin coatings onto a substrate and in a vacuum comprising the steps of heating within a non-metallic furnace a quantity of tin to a first predetermined temperature in excess of its melting temperature; contacting the upper surface of said liquid tin with a second metal having a vapor pressure at least an order of magnitude less than that of said tin and capable of forming an oxide having a vapor pressure greater than that of tin, said second metal being selected from the group consisting of molybdenum, tantalum, and tungsten; maintaining said first predetermined temperature to cause residual tin oxide on the surface of said liquid tin to volatilize as an oxide of said second metal whereby clean surfaces of said liquid tin are exposed; subsequently subjecting said furnace to a second predetermined temperature whereat only said tin is volatilized; and exposing said substrate only during said last-mentioned step whereby tin coatings having a high degree of purity and uniformity are deposited thereon.

9. The method of vacuum-depositing tin coatings having a high degree of purity and uniformity onto a substrate comprising the steps of mounting said substrate in spaced relationship to a graphite furnace within a vacuum chamber of predetermined pressure; providing a removable shield adjacent the surface of said substrate to prevent volatilized particles from said furnace being deposited on said substrate; combining a quantity of tin and a reducing metal within said furnace, said reducing metal having a melting temperature at least in excess of 1600° C. and being selected from the group consisting of molybdenum, tantalum, and tungsten; heating said furnace to a temperature of about 1200° C. whereat said tin liquefies and said reducing metal forms a volatile oxide with residual tin oxide floating on the surface of said liquid tin so as to expose clean surfaces of said liquid tin; heating said furnace to a temperature of about 1600° C.; and removing said shield adjacent said surface of said substrate whereby volatilized tin is rapidly deposited onto said substrate.

10. The method of claim 9 wherein said reducing metal is molybdenum.

11. The method of claim 9 wherein said reducing metal is tantalum.

12. The method of claim 9 wherein said reducing metal is tungsten.

13. The method of depositing first metal coatings onto a substrate in a vacuum comprising the steps of placing a quantity of said first metal and a second metal within an evaporation source structure, said second metal being selected from the group consisting of molybdenum, tantalum, and tungsten, said source structure being formed of a material ineffective to alloy with said first metal; heating said source structure to a first predetermined temperature at which said first metal only liquefies and wets said second metal and at which said second metal is capable of forming an oxide volatilizable at said first temperature; maintaining said source structure at said first temperature to volatilize any residual oxides of said first metal as oxides of said second metal, said residual first metal oxides of said first metal being non-volatilizable at said first temperature; heating said source structure to a second predetermined temperature below the evaporation temperature of said second metal and at which said first metal is rapidly evaporated; and exposing said substrate to said source only during said last-mentioned step whereby coatings of high purity and uniformity are deposited thereon.

References Cited in the file of this patent

UNITED STATES PATENTS 2,160,981 O'Brien _____ June 6, 1939
2,589,175 Weinrich _____ Mar. 11, 1952

OTHER REFERENCES

Holland: "Vacuum Deposition of Thin Films," 1956, John Wiley and Sons, Inc., New York, N.Y., pp. 123, 180 and 306.